UNITED STATES PATENT OFFICE.

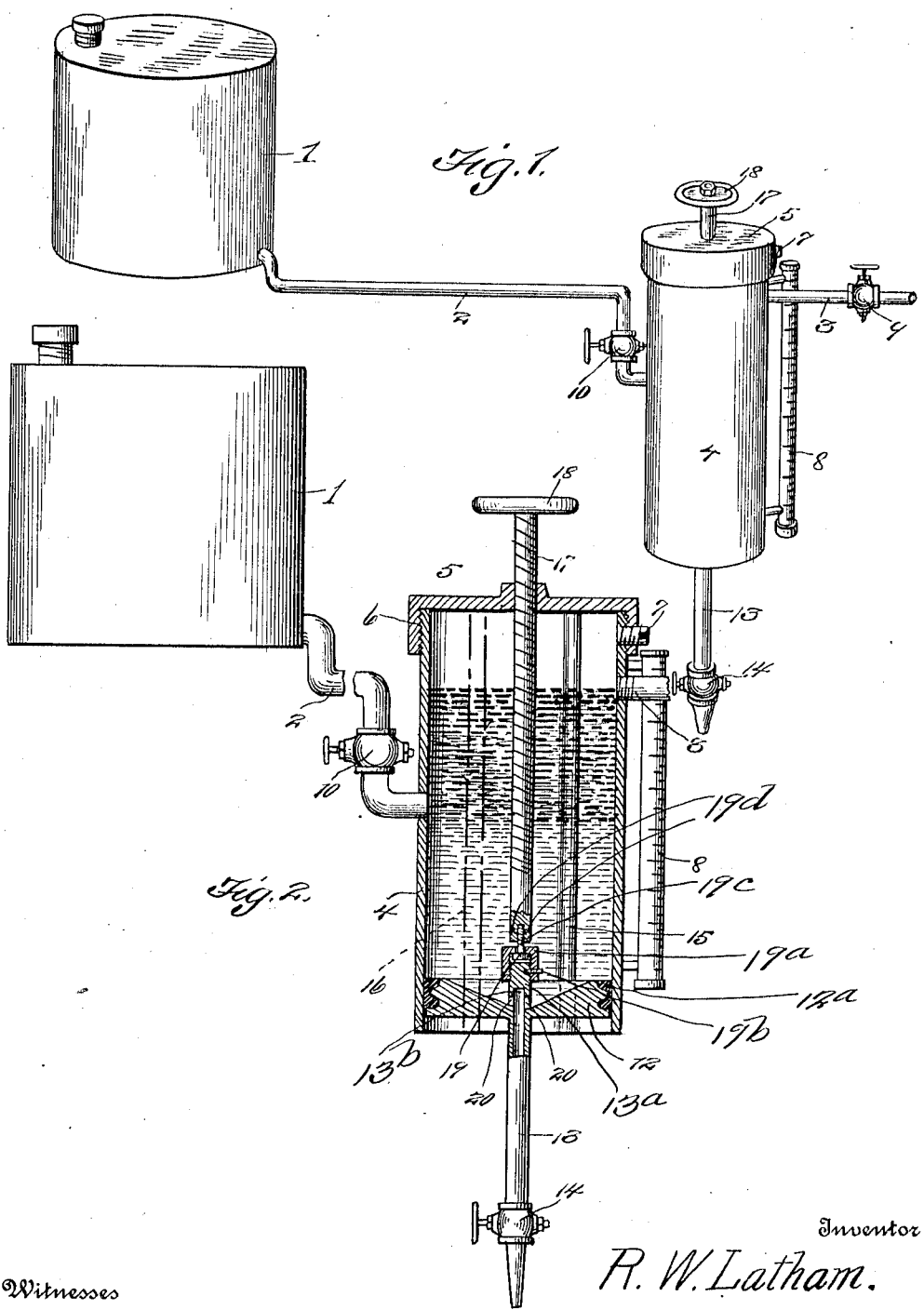

REGINALD W. LATHAM, OF SAN BENITO, TEXAS.

OIL-SEPARATOR.

1,019,809.

Specification of Letters Patent.

Patented Mar. 12, 1912.

Application filed March 6, 1911. Serial No. 612,591.

*To all whom it may concern:*

Be it known that I, REGINALD W. LATHAM, a citizen of the United States, residing at San Benito, State of Texas, have invented a new and useful Oil-Separator; and I do hereby declare the following to be a full, clear, and exact description of the invention, such as will enable others skilled in the art to which it appertains to make and use the same.

This invention relates to a new and useful oil separator, and the object of the invention is to provide a device of this design in which there exist novel features of construction.

The principal object of the invention is the provision of a simple, effective and practical separator for separating oil, or any other fluid lighter than water, and which is more especially adapted for separating oils, when in their crude state, or when distilled.

A further object of the invention is to provide the separator tank with a movable bottom, whereby the contents of the tank may be elevated, so that the entire contents may be removed.

The invention comprises further features and combination of parts, hereinafter set forth, shown in the drawings and claimed.

In the drawings:—Figure 1 is a perspective view of a separator, constructed in compliance with the invention. Fig. 2 is a sectional view through the separator, in order to disclose the novel features of the device.

Referring to the accompanying drawings, 1 designates an oil supply tank, from which and to a separator tank a pipe 2 extends. Leading from the separator tank is a pipe or conduit 3, which is adapted to connect with a crude oil burner (not shown). The separator tank 4 is provided with a closure or cover 5, which is threaded thereto as shown at 6, there being a pin 7 threaded through the flange of the closure or cover and into the tank, to prevent the closure or cover from unscrewing. The separator tank is provided with a gage glass 8, adapted to indicate the level of the water in the tank. The pipe or conduit 3 is provided with a valve 9 for shutting off the outward flow of the oil, and is located above the pipe or conduit 2, while the pipe 2 is also provided with a valve 10, for shutting off the inlet of the oil into the tank. The inlet of the pipe 2 into the tank is below the connection of the pipe 3 with the tank.

The contents of the supply tank 1 enters the separator tank, and the water including the sediment, being the heavier, settles in the bottom of the separator tank, while the oil thereabove, flows out through the pipe or conduit 3 to the crude oil burner (not shown), the flow of the oil being controlled by the valve 9.

The separator tank 4 is provided with a movable bottom 12, which is guided vertically when raised, by the guides 15 and 16. Forming a part of and projecting downwardly from the bottom 12 is a pipe 13, which is provided with a valve 14. This valve 14 is for the purpose of drawing off the sediment and the water below the oil. Projecting upwardly from the bottom 12 is an extension $13^a$, the hollow portion $13^b$ of which is an extension of the interior of the pipe 13. This extension $13^a$ is provided with openings 20, through which the sediment may pass into the pipe 13. A screw 17 having a hand wheel 18, is threaded through the closure or cover 5, and is connected at its lower end to the extension $13^a$ by means of the swivel connection 19. This swivel connection 19 comprises the cap $19^a$, which is threaded to the extension $13^a$, and is secured against unscrewing by the threaded pin $19^b$. A headed screw $19^c$ is provided. The shank of this screw passes through the cap $19^a$ and is threaded into the lower end of the screw 17 and secured against movement by the threaded pins $19^d$, while the head of the screw $19^c$ is located in the hollow of the cap $19^a$. By this construction it will be seen that the screw 17 is swiveled to the extension $13^a$.

As the oil in the separator tank 4 diminishes by passing out through the pipe 3, the bottom 12 is gradually raised, by the manipulation of the screw 17. The bottom 12 is not to be raised until it is even with the pipe 3, for the reason that, the sediment will pass through the pipe 3. However, when the bottom 12 is raised above the point of connection of the pipe 2 with the separator tank 4, the valve 10 is closed, so as to prevent the oil from the tank 1 from passing below the bottom 12. The bottom 12 is provided with suitable packing $12^a$, so as to render a close connection with the interior circumference of the tank 4.

The invention having been set forth, what is claimed as new and useful is:—

1. In a device as set forth, a separator tank having an inlet and outlet pipe, the outlet pipe being arranged above the point of the inlet pipe, a gage glass extending substantially the entire height of the separator tank, a vertically movable bottom in the separator tank and provided with a drain pipe having a valve, a hand screw threaded through the top of the separator tank, and a swivel connection between the lower ends of the hand screw and the bottom.

2. In a device as set forth, a separator tank having inlet and outlet pipes, a vertically movable bottom arranged in the separator tank, guides therefor, the bottom having a drain pipe provided with a valve, the bottom having an upper extension provided with opposite openings, through which the sediment passes in the drain pipe, a hand screw threaded through the top of the separator tank, and a swivel connection between the lower end of the hand screw and the extension.

In testimony whereof I have signed my name to this specification in the presence of two subscribing witnesses.

REGINALD W. LATHAM.

Witnesses:
L. O'BRYAN,
F. A. ROBERTSON.

Copies of this patent may be obtained for five cents each, by addressing the "Commissioner of Patents, Washington, D. C."